United States Patent
Lam et al.

(10) Patent No.: US 11,418,342 B2
(45) Date of Patent: Aug. 16, 2022

(54) SYSTEM AND METHODS FOR DATA EXCHANGE USING A DISTRIBUTED LEDGER

(71) Applicant: Hong Kong Applied Science and Technology Research Institute Co., Ltd., Shatin (HK)

(72) Inventors: Tak Wing Lam, Hong Kong (HK); Kai Wah Yeung, Lam Tin (HK); Tak Fuk Wong, Hong Kong (CN)

(73) Assignee: Hong Kong Applied Science and Technology Research Institute Co.. Ltd., Shatin (HK)

( * ) Notice: Subject to any disclaimer, the term of this patent is extended or adjusted under 35 U.S.C. 154(b) by 421 days.

(21) Appl. No.: 16/732,867

(22) Filed: Jan. 2, 2020

(65) Prior Publication Data

US 2021/0211286 A1    Jul. 8, 2021

(51) Int. Cl.
  *H04L 9/32* (2006.01)
  *H04L 9/06* (2006.01)
  (Continued)

(52) U.S. Cl.
  CPC ............ *H04L 9/3213* (2013.01); *G16Y 30/10* (2020.01); *G16Y 40/30* (2020.01); *H04L 9/0643* (2013.01);
  (Continued)

(58) Field of Classification Search
  CPC . H04L 9/3213; H04L 9/0643; H04L 67/1044; H04L 67/1059; H04L 67/12;
  (Continued)

(56) References Cited

U.S. PATENT DOCUMENTS 10,264,066 B2    4/2019  Fishier et al.
11,314,891 B2 *  4/2022  Hennebert .......... G06F 21/6245
(Continued)

FOREIGN PATENT DOCUMENTS

CN    108156232 A    6/2018
CN    108694330 A    10/2018
(Continued)

OTHER PUBLICATIONS

International Search Report and Written Opinion issued for PCT Application No. PCT/CN2020/071953, dated Sep. 30, 2020, 9 pages.

*Primary Examiner* — Mohammed Waliullah
(74) *Attorney, Agent, or Firm* — Norton Rose Fulbright US LLP

(57) ABSTRACT

Systems and methods which provide data exchange using a distributed ledger, wherein data is exchanged off-chain and information for accessing the off-chain data is exchanged through the blockchain, are disclosed. Embodiments may provide a hybrid blockchain data exchange platform storing large amounts of data (e.g., IoT data) in a data server outside of the blockchain, wherein a data consumer may obtain data from the data server using a token obtained from the blockchain. Embodiments of a hybrid blockchain data exchange platform provide for accuracy and security of the data without requiring storage of the full contents of the data (Continued)

within the blockchain, and/or provide data exchange in which the irrefutability of the data exchanged is ensured.

22 Claims, 5 Drawing Sheets

(51) Int. Cl.
*H04L 67/12* (2022.01)
*H04L 9/00* (2022.01)
*H04L 67/104* (2022.01)
*G16Y 40/30* (2020.01)
*G16Y 30/10* (2020.01)

(52) U.S. Cl.
CPC ...... *H04L 67/1044* (2013.01); *H04L 67/1059* (2013.01); *H04L 67/12* (2013.01); *H04L 9/50* (2022.05)

(58) Field of Classification Search
CPC ............. H04L 2209/38; H04L 63/0435; H04L 63/123; H04L 2209/805; H04L 9/3247; H04L 9/3239; G16Y 30/10; G16Y 40/30
See application file for complete search history.

(56) References Cited

U.S. PATENT DOCUMENTS

| | | |
|---|---|---|
| 2019/0013934 A1 | 1/2019 | Mercuri et al. |
| 2019/0165945 A1 | 5/2019 | Cleaver et al. |
| 2019/0303920 A1* | 10/2019 | Balaraman ............. H04L 63/12 |
| 2019/0342290 A1 | 11/2019 | Mittal et al. |
| 2020/0169387 A1* | 5/2020 | Wei .................... G06F 21/6272 |
| 2020/0389290 A1* | 12/2020 | Bathen .................. G11B 7/004 |

FOREIGN PATENT DOCUMENTS

| | | | |
|---|---|---|---|
| CN | 109450849 A | 3/2019 | |
| CN | 109450910 A | 3/2019 | |
| CN | 110189121 A | 8/2019 | |
| WO | WO-17098519 A1 | 6/2017 | |
| WO | WO-17223540 A1 | 12/2017 | |
| WO | WO-2018232221 A * | 12/2018 | ......... G06Q 30/0207 |

* cited by examiner

SYSTEM AND METHODS FOR DATA EXCHANGE USING A DISTRIBUTED LEDGER

TECHNICAL FIELD

The present invention relates generally to data exchange between a data provider and a data consumer and, more particularly, to data exchange using a distributed ledger.

BACKGROUND OF THE INVENTION

The Internet of Things (IoT) is a system of interrelated computing devices, mechanical and digital machines, objects, animals or people that are provided with unique identifiers (UIDs) and the ability to transfer data over a network without requiring human-to-human or human-to-computer interaction. With the widespread adoption of connected devices, such as smart appliances, cameras, voice controlled personal assistants, smartphones, sensors, etc., the IoT system is becoming widely used. Accordingly, a large amount of IoT data (e.g., sensor data, captured video and/or audio, transaction data, etc.) is being generated. Such diverse and robust IoT data may be utilized by a number of data consumers (e.g., individuals, commercial enterprises, governmental departments, researchers, security forces, and/or the like) for various purposes (e.g., identifying needs to be served, determining eligibility for special offers, targeting advertising and other marketing efforts, identifying behaviors and trends, identifying security threats, etc.). However, the sheer volume of available IoT data and its diverse sources can prove challenging for a data consumer to identify relevant available IoT data, to determine a location from which relevant IoT data is available, and to access and obtain specific IoT data.

Moving the IoT data into a decentralized path can provide advantages with respect to avoiding single point of failure and facilitating widespread data discovery and access. Blockchain is one relatively recent technology which has become popular in implementing decentralization systems.

Blockchain technology provides for data to be distributed throughout a network of storage nodes (i.e., blockchain network) and securely stored in a digital or distributed ledger. In operation of a blockchain, a growing list of blocks (ledger) which are linked using cryptography are generated and maintained. Each block contains a cryptographic hash of the previous block (hash, transaction data, etc.). Each node in blockchain network has a copy of the ledger, thereby providing a distributed ledger. A consensus mechanism (e.g., proof of work) maintains synchronization with respect to all of the ledgers. In a permissioned private blockchain, only authorized participants can join the network, and read and commit a transaction (e.g., useful for enterprise applications, allowing only trusted nodes to participate in the blockchain operation). Permissioned private blockchains generally allow for high scalability (e.g., Hyperledger can achieve 3500 transactions per second). In a permissionless public blockchain, anyone can join the network, read, write and commit a transaction (e.g., useful for cryptocurrency applications, allowing anyone to participate in the blockchain operation). Permissionless public blockchains generally provide low scalability (e.g., Bitcoin requires around 10 minutes to confirm a single transaction).

Blockchain can provide a powerful technology that decentralizes computation and management processes which can solve many IoT data issues (e.g., data security, discoverability, and access). However, practical implementation of blockchain technology for storage of and access to IoT data is itself challenging. For example, blockchain distributed ledgers utilize appreciable computing resources in generating the chained blocks of data stored by each node of the blockchain network. IoT data presents a tremendous amount of data which, if the IoT data management platforms merely store the IoT data to a blockchain, may prove impractical. For example, performing raw IoT data transaction on-chain may not be favorable in light of the tremendous amount of IoT data involved. The transaction speed available with respect to IoT data transactions implemented on-chain is likely to be unacceptably low due to the consensus protocol implemented by the blockchain. Moreover, every node in the blockchain would have a copy of the distributed ledger, including every transaction on the IoT data, and thus may consume a tremendous amount of storage space. Accordingly, the blockchain is likely to have issues with respect to long processing times and requiring large blockchain storage space if tasked with storing IoT data.

Some prior attempts at moving IoT data into a decentralized path include the IoT data management platform have been made. For example, CN108694330A, the disclosure of which is incorporated herein by reference, discloses an IoT data management platform in which a node in a blockchain network receives the IoT data and determines data validity. The valid data will be written into the blockchain network. The node in a blockchain network also receives operation instruction and determines its validity. Data service is generated if the operation instruction is valid. U.S. Pat. No. 10,264,066B2, the disclosure of which is incorporated herein by reference, discloses a technique for peer-to-peer (P2P) data sharing among IoT networks. In particular, the techniques therein provide for data sharing between two IoT platforms through P2P connection involving a security token. US2019/0165945A1, the disclosure of which is incorporated herein by reference, discloses a multi-node transaction management system to generate one-time token for a group of client nodes with help of a blockchain platform. None of these prior attempts, however, address issues with respect to long processing times and large blockchain storage space as may be presented by IoT data.

BRIEF SUMMARY OF THE INVENTION

The present invention is directed to systems and methods which provide data exchange using a distributed ledger, wherein data is exchanged off-chain and information for accessing the off-chain data is exchanged through the blockchain. Embodiments of the present invention provide a hybrid blockchain implementation that avoids storing the bulk of the data within the blockchain, thus providing solutions well suited for data exchange with respect to very large volumes of data (e.g., IoT data). Embodiments facilitate data exchange with respect to large amounts of data using a blockchain system, enabling the data exchange in an efficient manner while preserving data accuracy and security.

Embodiments of the present invention may, for example, provide a hybrid blockchain data exchange platform storing large amounts of data (e.g., IoT data) in one or more data servers outside of the blockchain. This data may be made available (e.g., "published") by a data provider to data consumers by registering the data (e.g., as a data service) to the blockchain. A data consumer may access the distributed ledger of the blockchain to discover relevant data or data of interest and obtain a data token (e.g., data service token) from the blockchain for use in obtaining data from the one or more data servers. Thereafter, the data consumer may access or otherwise obtain data from one or more data servers using the token obtained from the blockchain. Such a hybrid blockchain implementation facilitates widespread discovery of and access to large amounts of data while avoiding issues with respect to long processing times and large blockchain storage space.

Embodiments of a hybrid blockchain data exchange platform of embodiments provide for accuracy and security of the data without requiring storage of the full contents of the data within the blockchain. For example, a data structure (e.g., Bloom filter) representative of the data may be stored by the blockchain and used in verifying the integrity of data obtained from one or more data servers of the hybrid blockchain data exchange platform. Representative data structures of embodiments utilize significantly less blockchain storage space than would storage of the data itself within the blockchain, while nevertheless facilitating data security and assurance of data accuracy.

Hybrid blockchain data exchange platforms of embodiments of the invention provide data exchange in which the irrefutability of the data exchanged is ensured. For example, the data obtained by a data consumer from a data server of the hybrid blockchain data exchange platform may be encrypted, wherein information (e.g., representative data structure, such as hash value, and decryption key) for extracting the data is stored within the blockchain by the data provider. The data consumer may obtain the information from extracting the data from the blockchain, thus confirming receipt of the data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings, in which.

DETAILED DESCRIPTION OF THE INVENTION

Figure 1:
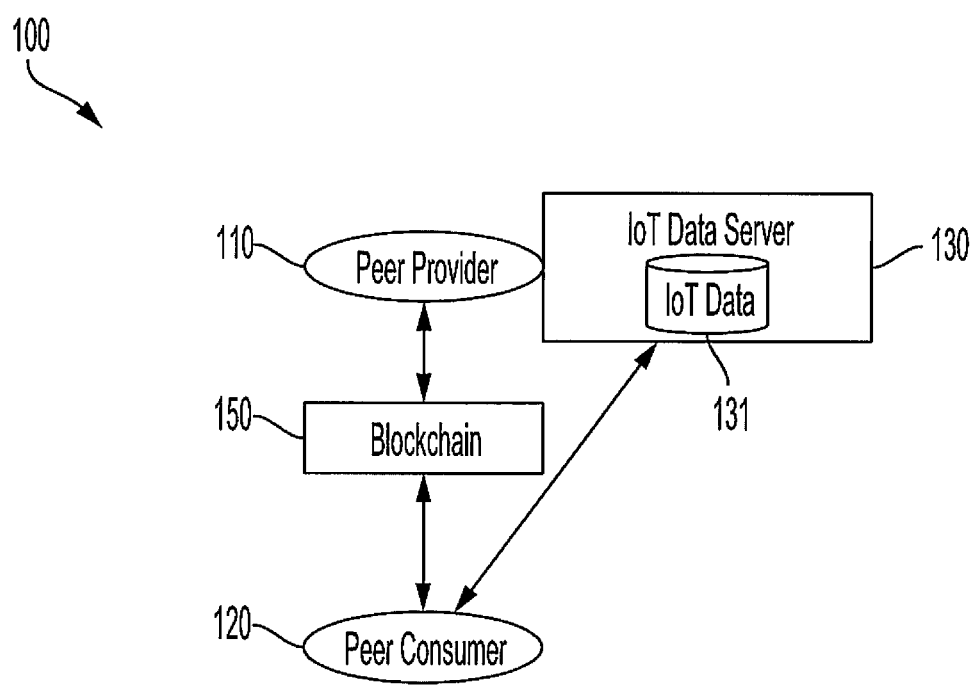
FIG. 1 shows a high level functional block diagram of a hybrid blockchain data exchange platform according to embodiments of the present invention.

FIG. 1 shows a high level functional block diagram of a hybrid blockchain data exchange platform configured to provide data exchange in accordance with concepts of the present invention. In operation of hybrid blockchain data exchange platform 100, data is exchanged off-chain and information for accessing the off-chain data is exchanged through the blockchain. Accordingly, hybrid blockchain data exchange platform 100 avoids storing the bulk of the data within the blockchain, and thus is well suited for facilitating data exchange with respect to very large volumes of data (e.g., IoT data).

In the example of hybrid blockchain data exchange platform 100 shown in FIG. 1 is configured for storing large amounts of data (e.g., IoT data 131) in one or more data servers, such as IoT data server 130, outside of the blockchain. This data may be made available by peer provider 110 to peer consumer 120 using blockchain 150, as described in further detail below. It should be appreciated that, although only one instance of a peer provider, peer consumer, IoT data server, and blockchain is shown in FIG. 1 for simplifying the illustration, a hybrid blockchain data exchange platform operable according to concepts of the present invention may include different numbers of any or all of the foregoing. For example, it is expected that a plurality of data consumers will access data of any particular data provider. Moreover, it is expected that a plurality of data providers will participate with respect to an implementation of a hybrid blockchain data exchange platform.

Peer provider 110 of the exemplary embodiment in FIG. 1 may, for example, comprise one or more systems of a source of IoT data (e.g., systems of an owner, operator, aggregator, etc. with respect to connected devices, such as smart appliances, cameras, voice controlled personal assistants, smartphones, sensors, drones, etc.) operable to generate, obtain, collect, aggregate, mange, or otherwise facilitate access to IoT data. Correspondingly, peer consumer 120 may, for example, comprise one or more systems of a consumer of IoT data (e.g., systems of an individual, commercial enterprise, governmental department, researcher, security force, etc.) operable to access, obtain, utilize, analyze, consume, or otherwise facilitate accessing IoT data for various purposes (e.g., identifying needs to be served, determining eligibility for special offers, targeting advertising and other marketing efforts, identifying behaviors and trends, identifying security threats, etc.). In accordance with some embodiments, peer provider 110 and/or peer consumer 120 may comprise one or more processor-based systems (e.g., personal computer or other computer implementation, web server or other server implementation, smartphone, tablet device, etc.) operating under control of instructions (e.g., program code) defining operation as described herein. For example, peer provider 110 and/or peer consumer 120 may comprise a central processing unit (CPU) in communication with computer readable memory storing program code which, when executed by the CPU, performs functions described herein.

IoT data server 130 of the exemplary embodiment in FIG. 1 provides a platform for collecting and serving IoT data 131. IoT data server 130 may, for example, comprise one or more data servers (e.g., web server or other server configuration, storage area network (SAN), redundant array of inexpensive disks (RAID) array, etc.) operable to store IoT data 131 provided by one or more data providers (e.g., peer provider 110). In accordance with some embodiments of the invention, IoT data sever 130 may be operated by, controlled by, or otherwise associated with peer provider 110 for storing IoT data provided by a data provider corresponding to peer provider 110. IoT data server 130 may be in data communication with one or more systems of peer provider 110 via a network, such as a local area network (LAN), a wide area network (WAN), the Internet, an intranet, a cellular communication network, etc., for receiving IoT data and associated information (e.g., data tokens, representative data structures, cryptographic keys, digital certificates/signatures, etc.), such as for storage, for management, maintenance, and control operations, etc. IoT data server 130 is preferably accessible to one or more systems peer consumer 120 via a network, such as a LAN, WAN, the Internet, an intranet, a cellular communication network, etc., for providing access to some or all of the IoT data and associated information (e.g., data tokens, representative data structures, cryptographic keys, digital certificates/signatures, etc.), such as for facilitating IoT data exchange with the peer consumer. In accordance with some embodiments, IoT data server 130 may comprise one or more processor-based systems (e.g., personal computer or other computer implementation, web server or other server implementation, smartphone, tablet device, etc.) operating under control of instructions (e.g., program code) defining operation as described herein. For example, IoT data server 130 may comprise a CPU in communication with computer readable memory storing program code which, when executed by the CPU, performs functions described herein.

Blockchain 150 of embodiments comprises a network of nodes operating cooperatively to form a permissioned private blockchain network. The blockchain system implemented as blockchain 150 is configured to support smart contracts. The smart contracts comprise computer code stored on blockchain 150 containing predetermined rules, wherein when rules are met, the code will be executed. Accordingly, blockchain 150 is operable to perform credible transactions without the help of third parties. Different roles and smart contracts may, for example, be pre-defined by a network administrator or other manager to address various needs, such as roles of peer provider (e.g., IoT data provider) and peer consumer (e.g., IoT data consumer) and smart contracts providing rules and associated code for implementing functions of the hybrid blockchain data exchange platform. Some exemplary smart contracts as may be utilized in implementing embodiments of hybrid blockchain data exchange platform are set forth in the table below.

| | Smart Contract Input Parameters | Record Created in Ledger | Return Values of Smart Contract |
|---|---|---|---|
| (SC1) Smart Contract for IoT Data Service Registration (for peer_provider only) | Identity of participant who invokes the contract<br>Data filtering parameters: data type, valid time, etc<br>Data access methods (rest, MQTT, etc.) | Identity of participant who invokes the contract<br>Data filtering parameters: data type, valid time, etc<br>Data access methods (rest, MQTT, etc.)<br>Data uuid of the record | Data uuid of the record |
| | {<br>peer_identity :<br>"peer_provider",<br>data_filtering_parameters:<br>["Location",<br>"20191201,12pm -<br>1pm"],<br>data_access_methods:<br>["rest api"]<br>} | {<br>peer_identity :<br>"peer_provider",<br>data_filtering_parameters:<br>["Location",<br>"20191001,12pm -<br>1pm"],<br>data_access_methods:<br>["rest api"],<br>data_uuid : data_101<br>} | {<br>data_uuid : data_101<br>} |
| (SC2) Smart Contract for IoT Data Service Discovery (for peer_consumer only) | Identity of participant who invokes the contract<br>Data filtering parameters: data type, valid time, etc | Read Operation, no block created | All record created by Smart Contract for IoT Data Service Registration (filtered by filtering parameters) |
| | {<br>peer_identity :<br>"peer_consumer",<br>data_filtering_parameters:<br>["Location"]<br>} | Read Operation, no block created | {<br>peer_identity :<br>"peer_provider",<br>data_filtering_parameters:<br>["Location",<br>"20191001,12pm - 1pm"]<br>data_access_methods:<br>["rest api"],<br>data_uuid : data_101 }<br>................. |

| | Smart Contract Input Parameters | Record Created in Ledger | Return Values of Smart Contract |
|---|---|---|---|
| (SC3) Smart Contract for Requesting Data Access Secret (for peer_consumer only) | Identity of participant who invokes the contract Data uuid of the data to be accessed Data filtering parameters: data type, valid time, etc | Identity of participant who invokes the contract Data uuid of the record Nonce (random number) Secret: hash value of data_access_secret and nonce | data_access_secret |
| | { peer_identity : "peer_consumer", data_uuid : data_101, data_filtering_parameters: xxx } | { peer_identity : "peer_consumer", data_uuid : data_101, nonce : nonce secret : hash("data_access_secret", nonce) } | { data_access_secret : "data_access_secret" } |
| (SC4) Smart Contract for validity of the data_access_secret checking (peer_provider only) | Identity of participant who invokes the contract Data Uuid of the data to be accessed Data_access_secret_provided | Read Operation, no block created | Validity |
| | { peer_identity : "peer_provider", data_uuid : data_101 data_access_secret_provided : "xxxxxxxxxx" } | Read Operation, no block created | ** check if secret = hash("data_access_secret_provided", nonce) if data_access_secret is valid, return 1 ** |
| (SC5) Smart Contract for bloom value saving (peer_provider only) | Identity of participant who invokes the contract Bloom Filter | Identity of participant who invokes the contract Bloom value bloom uuid of the record | bloom uuid of the record |
| | { peer_identity: "peer_provider", bloom_filter : bloom_filter } | { peer_identity : "peer_provider", bloom_filter : bloom_filter, bloom_filter_uuid : bloom_101 } | { bloom_filter_uuid : bloom_101 } |
| (SC6) Smart Contract for validity checking (peer_consumer only) | Identity of participant who invokes the contract Hash value of data Bloom uuid of the record | Read Operation, no block created | validity |
| | { peer_id : "peer_consumer", hash_data: Hash(data_x), bloom_uuid : bloom_101 } | Read Operation, no block created | { validity: 1/0 } *** Test if Hash(data_x) is an element using bloom_filter in (b), if yes, return 1 *** |
| (SC7) Smart Contract for Encryption Parameters Saving (peer_provider only) | Identity of participant who invokes the contract Hash value of encrypted data Encryption key | Identity of participant who invokes the contract Hash value of encrypted data Encryption key | Status of the request: 1: transaction committed 2: failed to commit |
| | { peer_id : "peer_provider", hash_value: hash_value, key : key } | { peer_id : "peer_provider", hash_value: hash_value, key : key } | { Status: 1/0 } |

-continued

| | Smart Contract Input Parameters | Record Created in Ledger | Return Values of Smart Contract |
|---|---|---|---|
| (SC8) Smart Contract for Decryption Key Request (peer_consumer only) | Identity of participant who invokes the contract Hash value of encrypted data<br><br>{<br>peer_id :<br>"peer_consumer",<br>hash_value:<br>hash_value,<br>} | Identity of participant who invokes the contract Hash value of encrypted data<br><br>{<br>peer_id :<br>"peer_consumer",<br>hash_value:<br>hash_value,<br>} | Key of the decryption key<br><br><br><br>{<br>key: key<br>} |

Hybrid blockchain data exchange platform 100 is configured for facilitating data exchange with respect to a large body of data (e.g., IoT data) using blockchain technology. In operation of hybrid blockchain data exchange platform 100 shown in FIG. 1, data may be made available (e.g., "published") for access by peer consumer 120 by peer provider 110 registering the data (e.g., as a data service) to blockchain 150. Thereafter, peer consumer 120 may access the distributed ledger of blockchain 150 to discover relevant data or data of interest and obtain a data token (e.g., security token, such as a digital signature) from the blockchain for use in obtaining data from IoT data server 130. Peer consumer 120 may thus access or otherwise obtain some portion of IoT data 131 from IoT data server 130 using the token obtained from blockchain 150. As can be appreciated from the foregoing, data of IoT data 131 is exchanged off-chain (i.e., raw, or full/complete, IoT data is neither stored nor directly provided by blockchain 150), whereas information (e.g., data tokens) for accessing relevant data of IoT data 131 is exchanged through blockchain 150.

Figure 2:
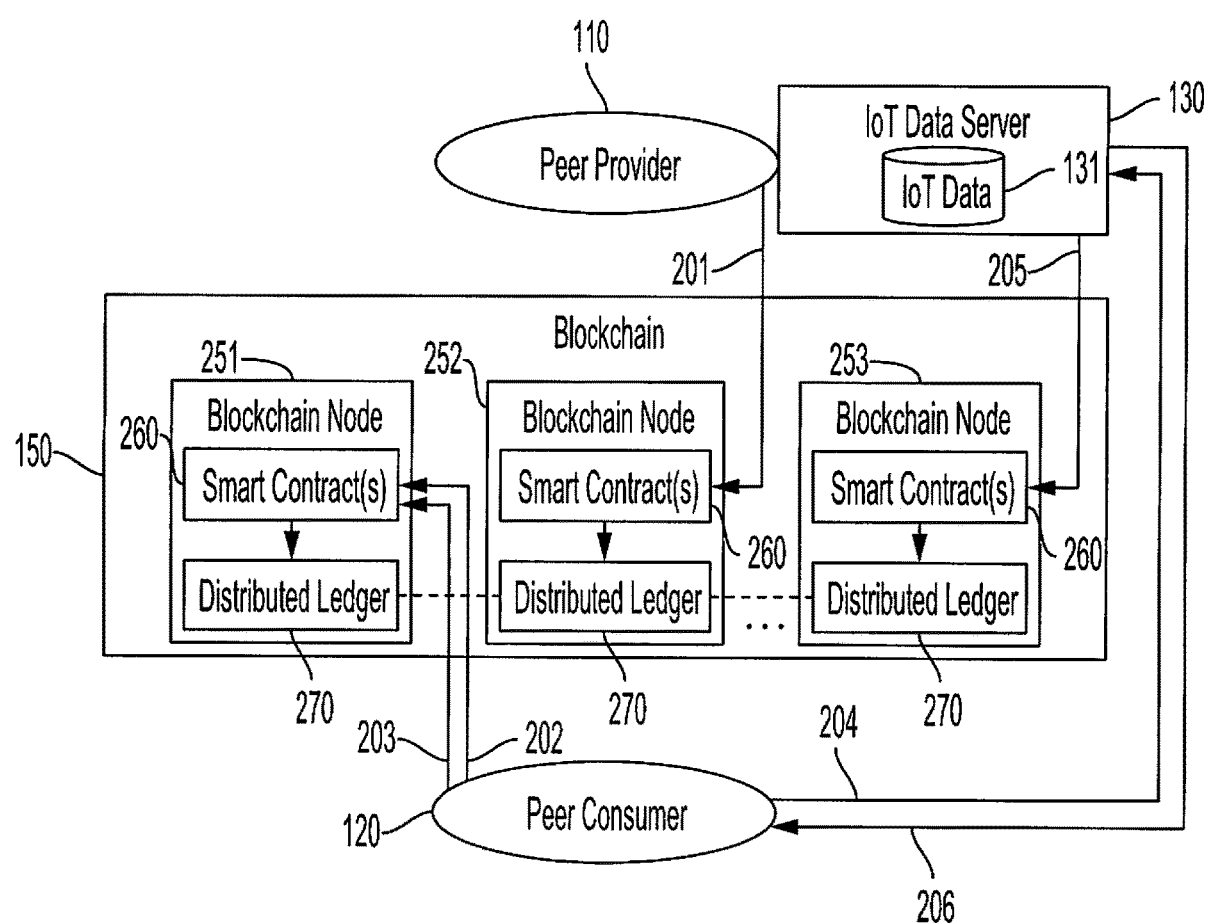
FIG. 2 shows further detail with respect to the operation of hybrid blockchain data exchange platform of FIG. 1.
Figure 3:
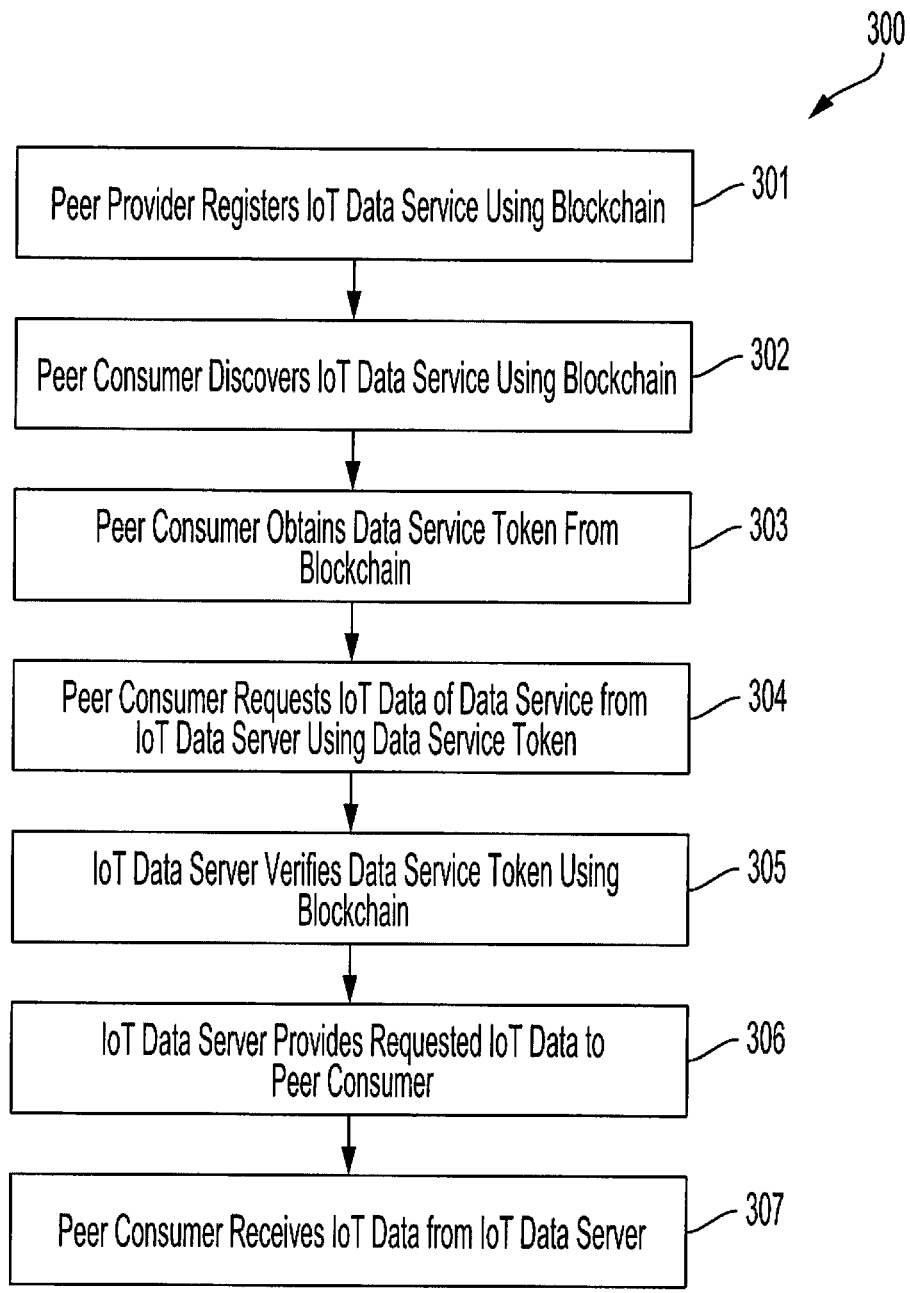
FIG. 3 shows a flow diagram setting forth a functional flow of operation by a hybrid blockchain data exchange platform to provide data exchange according to embodiments of the present invention.

FIG. 2 shows further detail with respect to the operation of hybrid blockchain data exchange platform 100 described above, according to embodiments. In particular, FIG. 2 provides a logical flow diagram of operation according to embodiments of hybrid blockchain data exchange platform 100. A flow diagram setting forth a functional flow corresponding to the logical flow of FIG. 2 is shown in FIG. 3 as flow 300. As described above with respect to the operation of hybrid blockchain data exchange platform 100, operation according to the flows of FIGS. 2 and 3 provides for exchanging data off-chain, wherein raw IoT data is not stored in distributed ledger 270, as described in detail below.

Hybrid blockchain data exchange platform 100 of embodiments of the invention implements a procedure for peer provider 110 to register data and for peer consumer 120 to discover the data. Accordingly, at block 301 of flow 300, peer provider 110 registers a data service corresponding to data of IoT data 131 using blockchain 150, as illustrated by arrow 201 in FIG. 2. In accordance with embodiments, peer provider 110 may invoke a smart contract of smart contracts 260 (e.g., smart contract SC1 of the examples above) to register an IoT data service. Registration of the data service may include specifying various attributes for the data, its storage, and access. For example, peer provider 110 may specify various data filtering parameters (e.g., data type, valid time, etc.), data access methods (e.g., rest, MQTT, etc.), and/or the like. Correspondingly, peer provider 110 may store IoT data 131 to IoT data server 130, or otherwise control IoT data server 130 to collect IoT data 131 for serving to data consumers in accordance with the registered data service.

At block 302 of flow 300, peer consumer 120 discovers the IoT data service using blockchain 150, as illustrated by arrow 202 in FIG. 2. In accordance with embodiments of the invention, peer consumer 120 may invoke a smart contract (e.g., smart contract SC2 of the examples above) to discover the IoT data service registered by peer provider 110.

If peer consumer 120 wishes to consume data of the data service, peer consumer 120 obtains a data service token for the data from blockchain 150 at block 303 of flow 300, as illustrated by arrow 203 of FIG. 2. For example, peer consumer 120 may analyze information (e.g., data type, valid time, etc.) with respect to the registered data service to determine if data of IoT data 131 is relevant or useful for one or more purpose of the peer consumer. If it is determined that peer consumer 120 desires to consume some portion of IoT data 131, peer consumer 120 may invoke a smart contract (e.g., smart contract SC3 of the examples above) to request a data token for the data service (e.g., data service token comprising a security token, such as a digital signature in the form of "data_access_secret"), according to embodiments of the invention. The data token may, for example, be generated by operation of the aforementioned smart contract (e.g., data_access_secret may be a pseudo random number, such as hash(peer_provider+peer_consumer+cryptopgrapic nonce), where '+' means append, generated when smart contract SC3 is called).

At block 304 of flow 300, peer consumer 120 requests data of IoT data 131 from IoT data server 130 using the data token, as illustrated by arrow 204 of FIG. 2. In accordance with embodiments, peer consumer 120 may provide the data token (e.g., data_access_secret) obtained from blockchain 150 to IoT data server 130 with a request for some or all of IoT data 131.

At block 305 of flow 300, IoT data server 130 verifies the data token using blockchain 150, as illustrated by arrow 205 of FIG. 2. In accordance with embodiments, IoT data server 130, or peer provider 110 operating in cooperation with IoT data server 130, may invoke a smart contract (e.g., smart contract SC4 of the examples above) to check the validity of the data token (e.g., data_access_secret) provided by peer consumer 120.

If the data token is determined to be valid, IoT data server 130 provides the requested data of IoT data 131 to peer consumer 120 at block 306 of flow 300, as illustrated by arrow 206 of FIG. 2. In accordance with embodiments of the invention, IoT data server 130, as may be operating in cooperation with peer provider 110, sends requested data (e.g., data_0, data_1 . . . data_n) of IoT data 131 to peer consumer 120. Thereafter, peer consumer 120 receives the data at block 307 of flow 300.

As can be appreciated from the foregoing, operation according to blocks 301-307 cooperate to perform data transfer (exchange of data) from peer provider 110 to peer consumer 120 wherein, although blockchain 150 is used to facilitate the data transfer, the data is exchanged off-chain (i.e., raw IoT data is not directly provided by blockchain 150). Accordingly, widespread discovery of and access to IoT data 131 is provided while issues with respect to long processing times and large blockchain storage space in blockchain 150 are avoided. Although IoT data 131 is provided to peer consumer 120 off-chain, embodiments of hybrid blockchain data exchange platform 100 are nevertheless configured to facilitate verification of the integrity of the data of IoT data 131 exchanged off-chain and/or to ensure the irrefutability of the data exchanged.

Figure 4A:
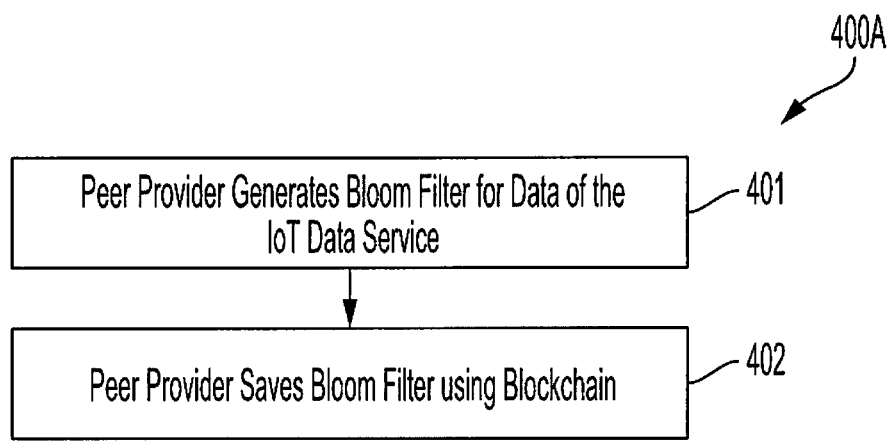
FIGS. 4A and 4B show flow diagrams setting forth a functional flow for verification of the integrity of data of IoT data according to embodiments of the present invention.
Figure 4B:
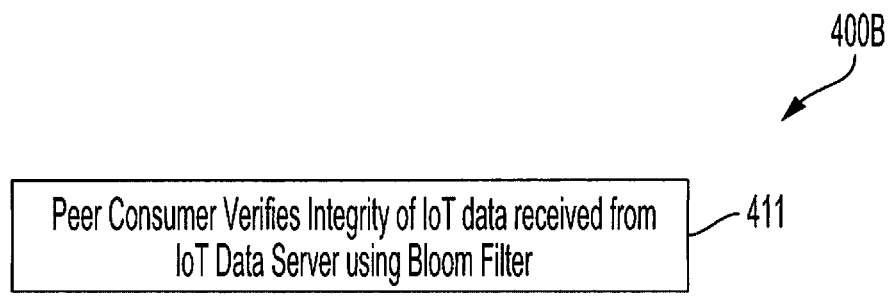

FIGS. 4A and 4B show exemplary flow diagrams setting forth a functional flow for verification of the integrity of data of IoT data 131 provided to peer consumer 120 by hybrid blockchain data exchange platform 100. In particular, the example of FIGS. 4A and 4B use a filtering technique for verifying the integrity of the IoT data exchanged off-chain.

In providing operation for facilitating verification of the integrity of the IoT data according to flow 400A of FIG. 4A, at block 401 peer provider 110, or IoT data server 130 operating in cooperation with peer provider 110, generates a data structure representative of IoT data 131, or some portion thereof, to be stored by blockchain 150 for use in verifying the integrity of data. The data structure representative of IoT data 131 may, for example, comprise a Bloom filter or other data structure designed to efficiently (e.g., rapidly and memory-efficiently) indicate whether an element is present in a set. In accordance with embodiments of the invention, peer provider 110 aggregates a number of data of IoT data 131 (e.g., the data of IoT data 131 provided to peer consumer at block 306 of flow 300), and creates a Bloom filter therefrom (e.g., bloom_filter).

At block 402 of flow 400A, peer provider 110 stores the data structure representative of IoT data 131 to blockchain 150. In accordance with embodiments, peer provider 110 may invoke a smart contract (e.g., smart contract SC5 of the examples above) to save the data structure representative of IoT data 131 (e.g., bloom_filter, such as may comprise [Hash(data_1), Hash(data_2) . . . Hash(data_n)]) in the distributed ledger of blockchain 150. IoT data server 130 may also save an identifier (e.g., universally unique identifier (UUID)) of the bloom filter record (e.g., bloom_filter_uuid) for repeated requests. For example, in the case that a peer consumer subsequently requests the same IoT data (e.g., data_1) which has been requested by previously by another peer consumer, the data structure representative of the IoT data (e.g., bloom_filter) and resource identifier (e.g., bloom_filter_uuid) have already saved in the ledger of blockchain 150. Thus, the IoT data server may avoid invoking SC5 to save the bloom value again and may send the resource identifier (e.g., bloom_filter_uuid) and the IoT data (e.g., data_1) directly to the subsequent peer consumer.

In operation according to embodiments, IoT data server 130 may notify peer consumer 120 (e.g., at block 402 of flow 400A) that the data of IoT 131 may be verified. For example, IoT data server 130 may provide a resource identifier (e.g., bloom_filter_uuid) corresponding to a Bloom filter stored by blockchain 150 to peer consumer 120, whereby peer consumer 120 is apprised of the ability to verify the data by having been provided access to the Bloom filter used for this purpose.

The operations of blocks 401 and 402 of flow 400A may be performed as part of the operations of flow 300, or separately. For example, operations of blocks 401 and/or 402 may be performed as part of the operations to provide the data at block 306. Operations of blocks 401 and/or 402 may likewise be performed after the operations of flow 300 have been completed (e.g., after completion of the operations of block 307).

In operation for facilitating verification of the integrity of the IoT data according to flow 400B of FIG. 4B, at block 411 peer consumer 120 uses the data structure stored by blockchain 150 representative of the data of IoT data to verify the data of IoT data received from IoT data server 130. In accordance with embodiments, peer consumer 120 may invoke a smart contract (e.g., smart contract SC6 of the examples above) with the resource identifier (e.g., bloom_filter_uuid) corresponding to a Bloom filter stored by blockchain 150 to verify data of IoT data 131 obtained from IoT data server 130. For example, if Hash (data_x) is an element of the Bloom filter (e.g., bloom_filter obtained from blockchain 150), the data received by peer consumer 120 from IoT data server 130 may be determined to be valid. Peer consumer 120 and peer provider 110 may, for example, use a predefined hash function (e.g., SHA1) for the hash value computation of the IoT data. IoT data server 130 of embodiments may create a mapping in the ledger (bloom_filter_uuid: bloom_value/bloom_filter), such as through operation of a smart contract (e.g., smart contract SC5, discussed above). Accordingly, peer consumer 120 may receive the resource identifier (e.g., bloom_filter_uuid) and IoT data (e.g., data_1) from the IoT data server and use the predefined hash function (e.g., SHA1) to compute a hash value (e.g., Hash(data_1)). In operation according to embodiments, peer consumer 120 may invoke smart contract SC6 with bloom_filter uuid and Hash(data_1), whereby blockchain 150 queries the bloom_filter with the bloom_filter_uuid, and tests whether Hash(data_1) is a member of the bloom_filter.

The operations of block 411 of flow 400B may be performed as part of the operations of flow 300, or separately. For example, operations of block 411 may be performed as part of the operations of peer consumer 120 receiving data from IoT data server 130 at block 307. Operations of block 411 may likewise be performed after the operations of flow 300 have been completed (e.g., after completion of the operations of block 307).

Figure 5A:
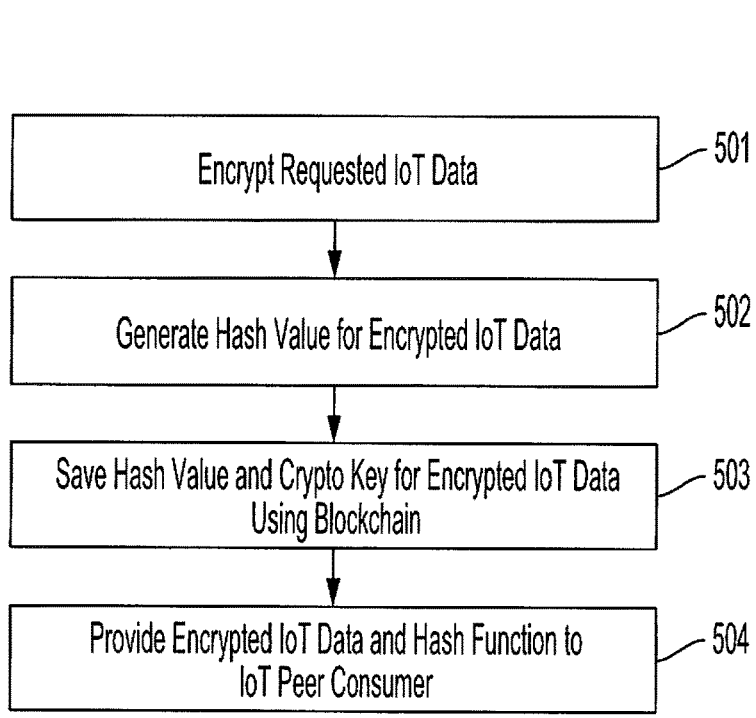
FIGS. 5A and 5B show flow diagrams setting forth a functional flow for ensuring the irrefutability of the data exchanged according to embodiments of the present invention.
Figure 5B:
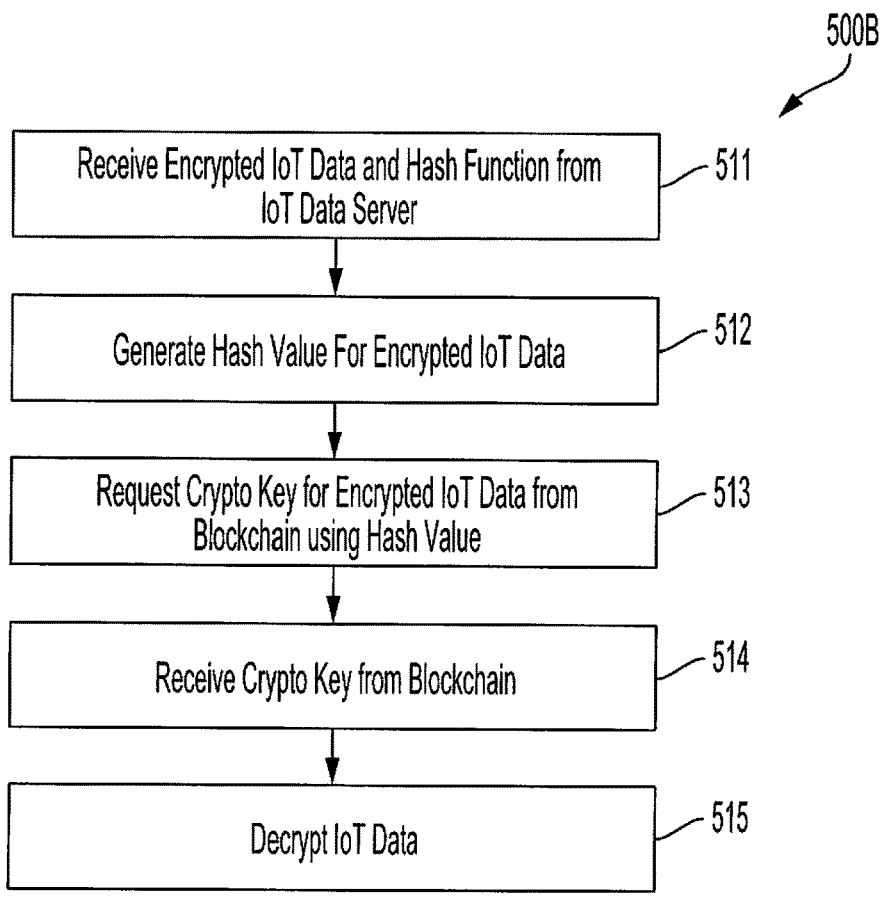

FIGS. 5A and 5B show exemplary flow diagrams setting forth a functional flow for ensuring the irrefutability of the data exchanged between IoT data server 120 and peer consumer 120 by hybrid blockchain data exchange platform 100. In particular, the example of FIGS. 5A and 5B use a data encryption and key exchange technique for ensuring irrefutability (i.e., peer provider 110 cannot deny on data sent and peer consumer 120 cannot deny on data received) of the IoT data exchanged off-chain.

In providing operation for ensuring the irrefutability of the data exchanged according to flow 500A of FIG. 5A, at block 501 data of IoT data 131 requested by peer consumer 120 is encrypted. In accordance with embodiments of the invention, peer provider 110, or IoT data server 130 operating in cooperation with peer provider 110, encrypts the data of IoT data 131 to be sent to peer consumer 120. For example, the data may be encrypted according to the following:

$$\text{encrypted\_data} = E(\text{data\_0} + \text{data\_1} \ldots \text{data\_}n, \text{key}).$$

At block 502 of flow 500A, information for use in peer consumer 120 extracting the data is generated. Information used in peer consumer 120 extracting the data may, for example, include a representative data structure, such as a hash value, in addition to a cryptographic key, etc. In accordance with embodiments, peer provider 110, or IoT data server 130 operating in cooperation with peer provider 110, may compute a representative data structure (e.g., hash value) for the data to be used by peer consumer 120 in extracting the data. For example, the representative data structure may be computed according to the following:

hash_value=Hash(encrypted_data).

At block 503 of flow 500A, information for use in peer consumer 120 extracting the data is stored within blockchain 150 by peer provider 110. In accordance with embodiments of the invention, peer provider 110 may invoke a smart contract (e.g., smart contract SC7 of the examples above) to save the representative data structure (e.g., hash_value) and a cryptographic key corresponding to the encryption of block 501 in the distributed ledger of blockchain 150. It should be appreciated that the encryption may comprise symmetric encryption (e.g., a same cryptographic key is used for encryption and decryption of the data) or asymmetric encryption (e.g., different cryptographic keys, such as public/private keys, are used for encryption and decryption of the data).

At block 504 of flow 500A, IoT data server 130 provides to peer consumer 120 an instance of encrypted data comprising requested data of IoT data 131, and information for verification of the data received from IoT data server 130. In accordance with embodiments, IoT data server 130, as may be operating in cooperation with peer provider 110, may send encrypted data of IoT data 131 (e.g., encrypted_data generated at block 501 of flow 500A) and a function (e.g., hash function hash_value=Hash(encrypted_data)) from which the representative data structure (e.g., hash_value generated in block 502 of flow 500A) for the encrypted data was generated to peer consumer 120.

The operations of blocks 501-504 of flow 500A may be performed as part of the operations of flow 300, or separately. For example, operations of blocks 501, 502, 503, and/or 504 may be performed as part of the operations to provide the data at block 306. Operations of blocks 501, 502, 503, and/or 504 may likewise be performed at other times in relation to the operations of flow 300.

In operation for ensuring the irrefutability of the data exchanged according to flow 500B of FIG. 5B, at block 511 peer consumer 120 receives encrypted data of IoT data 131 and the information for verification of the data received from IoT data server 130. In accordance with embodiments, peer consumer 120 may receive the encrypted data of IoT data 131 (e.g., encrypted_data) and a function (e.g., the hash function hash_value=Hash(encrypted_data)) from which the representative data structure (e.g., hash_value) for the encrypted data was generated from IoT data server 130.

At block 512 of flow 500B, the information for verification of the data received from IoT data server 130 is used with the encrypted data of IoT data 131 received from IoT data server 130 to generate information for use in peer consumer 120 extracting the data. In accordance with embodiments, peer consumer 120 may utilize the function (e.g., the hash function hash_value=Hash(encrypted_data)) with the encrypted data of IoT data 131 to compute a representative data structure (e.g., hash_value) for the data.

At block 513 of flow 500B, the information for verification of the data received from IoT data server 130 is included in a request for a cryptographic key for the encrypted data of IoT data 131. In accordance with embodiments of the invention, peer consumer 120 may invoke a smart contract (e.g., smart contract SC8 of the examples above) to provide the representative data structure (e.g., hash_value) for the data to blockchain 150 for obtaining a cryptographic key used to decrypt the encrypted data of IoT data 131.

In operation according to embodiments of the invention, blockchain 150 verifies that the representative data structure (e.g., hash_value) stored in the distributed ledger by peer provider 110 and the representative data structure (e.g., hash_value) provided in the request from peer consumer 120 match (i.e., the encrypted data received by peer consumer 120 is the same as the encrypted data generated/provided by peer provider 110 and/or IoT data server 130). Accordingly, peer consumer 120 cannot deny on the data received because no one but one who has received the encrypted data of IoT data 131 (e.g., encrypted_data) can provide the proper representative data structure (e.g., hash_value). Correspondingly, peer provider 110 cannot deny on the data sent because the representative data structure (e.g., hash_value) of the encrypted data has been saved in the distributed ledger of blockchain 150 from processing the request made by peer consumer 120.

If the encrypted data of IoT data 131 received by peer consumer 120 is verified to be the encrypted data of IoT data 131 generated/provided by peer provider 110 and/or IoT data server 130, blockchain 150 provides the requested cryptographic key for the encrypted data of IoT data 131 to peer consumer 120. Thus, at block 514 of flow 500B, peer consumer 120 receives the requested cryptographic key for the encrypted data of IoT data 131. In accordance with embodiments, the representative data structure (e.g., hash_value) provided in the request from peer consumer 120 is compared to the representative data structure (e.g., hash_value) stored in the distributed ledger by peer provider 110 to determine if they match and, if so, the cryptographic key corresponding to the encryption of block 501 stored in blockchain 150 by peer provider 110 is provided to peer consumer 120.

At block 515 of flow 500B, data of IoT data 131 is extracted from the encrypted data by peer consumer 120 using the cryptographic key received from blockchain 150. In accordance with embodiments of the invention, peer consumer 120 decrypts the data of IoT data 131 (e.g., data_0, data_1 . . . data_n) according to the following:

decrypted_data=D(encrypted_data, key).

Thereafter, peer consumer 120 may utilize the data as desired.

The operations of blocks 511-515 of flow 500B may be performed as part of the operations of flow 300, or separately. For example, operations of blocks 511, 512, 513, 514, and/or 515 may be performed as part of the operations to provide the data at block 307. Operations of blocks 511, 512, 513, 514, and/or 515 may likewise be performed at other times in relation to the operations of flow 300.

It should be appreciated that, when implemented in software, the functions of flows 300, 400A, 400B, 500A, and 500B providing aspects hybrid blockchain data exchange of the present invention may comprise code segments to perform the tasks as described herein. The code segments can be stored in a processor readable medium for execution by one or more processors of a processor-based system. The processor readable medium may include any medium that can suitably store and transfer information. Examples of the processor readable medium include an electronic circuit, a semiconductor memory device, a read only memory (ROM), a flash memory, an erasable ROM (EROM), an optical disk, a hard disk, etc. The code segments may be downloaded via computer networks such as a local area network (LAN), a wide area network (WAN), the Internet, an intranet, a cellular communication network, etc.

As can be appreciated from the foregoing exemplary embodiments, concepts of the present invention provide for data exchange using a distributed ledger, wherein data is exchanged off-chain and information for accessing the off-chain data is exchanged through the blockchain. Accordingly, hybrid blockchain implementations avoid storing the bulk of the data within the blockchain and provide solutions well suited for data exchange with respect to very large volumes of data, such as IoT data. It should be appreciated, however, that the concepts herein are not limited to use with respect to exchange of IoT data. For example, embodiments of a hybrid blockchain data exchange platform may be utilized with respect to various large databases, such as banking or merchant transaction records, video on demand libraries, public or governmental data sharing (e.g., map data, statistical data, etc.), document or music file sharing, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for exchange of data from a peer provider to a peer consumer, the method comprising:
    storing, by a data server for the peer provider, data available for exchange with one or more peer consumers;
    registering, by the peer provider using a blockchain network, a data service for the data available for exchange;
    receiving, by the data server or the peer provider from the peer consumer, a request for data of the data available for exchange, wherein the request for data includes a data token of the data service for the data available for exchange obtained by the peer consumer from the blockchain network;
    verifying, by the data sever or the peer provider using the blockchain network, the data token;
    providing, by the data server to the peer consumer, requested data of the data available for exchange if the verifying the data token confirms validity of the data token;
    generating, by the data server or the peer provider, a data structure representative of the data available for exchange; and
    storing the data structure representative of the data available for exchange to the blockchain network, wherein the storing the data structure to the blockchain network comprises:
        invoking a fifth smart contract of the blockchain network to save the data structure representative of the data available for exchange in the a distributed ledger of the blockchain network.

2. The method of claim 1, wherein the registering the data service comprises:
    invoking a first smart contract of the blockchain network to register the data service.

3. The method of claim 2, wherein the data token is obtained by the peer consumer after the peer consumer invokes a second smart contract of the blockchain network to discover the data service registered by peer provider, and after the peer consumer invokes a third smart contract of the blockchain network to request the data token.

4. The method of claim 2, wherein the verifying the data token comprises:
    invoking a fourth smart contract of the blockchain network to check the validity of the data token provided by the peer consumer.

5. The method of claim 1, wherein the data available for exchange comprises Internet of Things (IoT) data.

6. The method of claim 1, wherein the data token is a security token comprising a digital signature.

7. The method of claim 1, wherein the blockchain network is a permissioned private blockchain network.

8. The method of claim 1, wherein the blockchain network does not include the data server and does not store the data available for exchange, and wherein the providing the requested data by the data server to the peer consumer exchanges the requested data by the data server to the peer consumer off-chain with respect to the blockchain network.

9. The method of claim 1, wherein the data structure representative of the data available for exchange to the blockchain network comprises a Bloom filter for the data available for exchange to the blockchain network.

10. The method of claim 1, wherein the data structure representative of the data available for exchange is made available to the peer consumer by the blockchain network as part of the data service for verifying integrity of the requested data.

11. The method of claim 10, wherein the data structure representative of the data available for exchange is obtained by the peer consumer after the peer consumer invokes a sixth smart contract of the blockchain network as part of operation to verify data of the data available for exchanged obtained from data server by the peer consumer.

12. The method of claim 1, further comprising:
    encrypting the requested data, wherein the providing the requested data comprises providing an encrypted instance of the requested data to the peer consumer by the data server;
    generating information for use in the peer consumer extracting the requested data from the encrypted instance of the requested data; and
    storing the information for use in the peer consumer extracting the requested data and a cryptographic key for the encrypted instance of the requested data to the blockchain network.

13. The method of claim 12, wherein the storing the information for use in the peer consumer extracting the requested data and the cryptographic key to the blockchain network comprises:
    invoking a seventh smart contract of the blockchain network to save the information for use in the peer consumer extracting the requested data and the cryptographic key in a distributed ledger of the blockchain network.

14. The method of claim 12, wherein the providing the encrypted instance of the requested data to the peer consumer by the data server also provides information for verification of data received from the data server, wherein the cryptographic key is obtained by the peer consumer after the peer consumer generates, using the encrypted instance of the requested data and the information for verification of data received from the data server, corresponding information for use in the peer consumer extracting the requested data and invokes an eighth smart contract of the blockchain network to provide the corresponding information for use in the peer consumer extracting the requested data to the blockchain network.

15. The method of claim 14, wherein the information for use in the peer consumer extracting the requested data comprises a hash value for the encrypted instance of the requested data, and wherein the information for verification of data received from the data server comprises a hash function used to generate the hash value.

16. A hybrid blockchain data exchange system comprising:
 a data server storing data available for exchange with one or more peer consumers; and
 a peer provider system configured to register a data service for the data available for exchange using a blockchain network, wherein the hybrid blockchain data exchange system is configured to receive a request from a peer consumer system for data of the data available for exchange stored by the data server, wherein the request for data includes a data token of the data service, wherein the hybrid blockchain data exchange system is configured to use the blockchain network to verify the data token and provide to the peer consumer system requested data of the data available for exchange if the data token is verified, wherein the hybrid blockchain data exchange system is configured to encrypt the requested data as provided to the peer consumer system by the data server, to generate information for use in the peer consumer system extracting the requested data from an encrypted instance of the requested data, and to store the information for use in the peer consumer system extracting the requested data and a cryptographic key for the encrypted instance of the requested data to the blockchain network, and wherein the cryptographic key is obtained by the peer consumer system after the peer consumer system generates, using the encrypted instance of the requested data and the information for verification of data received from the data server, corresponding information for use in the peer consumer system extracting the requested data.

17. The hybrid blockchain data exchange system of claim 16, wherein the data available for exchange comprises Internet of Things (IoT) data.

18. The hybrid blockchain data exchange system of claim 16, wherein the blockchain network is a permissioned private blockchain network.

19. The hybrid blockchain data exchange system of claim 16, wherein the blockchain network does not include the data server and does not store the data available for exchange, and wherein the hybrid blockchain data exchange system is configured to provide the requested data to the peer consumer off-chain with respect to the blockchain network.

20. The hybrid blockchain data exchange system of claim 16, wherein the hybrid blockchain data exchange system is configured to generate a data structure representative of the data available for exchange and to store the data structure representative of the data available for exchange to the blockchain network, and wherein the data structure representative of the data available for exchange is made available to the peer consumer system by the blockchain network as part of the data service for verifying integrity of the requested data.

21. A method for exchange of data by a hybrid blockchain data exchange system from a peer provider to a peer consumer, the method comprising:
 storing, by a data server for the peer provider, data available for exchange with one or more peer consumers;
 invoking a first smart contract of a blockchain network by the peer provider to register a data service for the data available for exchange, wherein a data token is obtained by the peer consumer after the peer consumer invokes a second smart contract of the blockchain network to discover the data service registered by peer provider, and after the peer consumer invokes a third smart contract of the blockchain network to request the data token;
 receiving a request from the peer consumer for data of the data available for exchange, wherein the request for data includes the data token of the data service for the data available for exchange obtained by the peer consumer from the blockchain network;
 invoking a fourth smart contract of the blockchain network to check validity of the data token provided by the peer consumer;
 providing, by the data server to the peer consumer, requested data of the data available for exchange if the validity of the data token is confirmed;
 generating, by the data server or the peer provider, a data structure representative of the data available for exchange; and
 invoking a fifth smart contract to save the data structure representative of the data available for exchange to the blockchain network, wherein the data structure representative of the data available for exchange is made available to the peer consumer by the blockchain network as part of the data service for verifying integrity of the requested data, and wherein the data structure representative of the data available for exchange is provided to the peer consumer after the peer consumer invokes a sixth smart contract of the blockchain network as part of operation to verify data of the data available for exchanged obtained from data server by the peer consumer.

22. The method of claim 21, further comprising:
 encrypting the requested data, wherein the providing the requested data comprises providing an encrypted instance of the requested data to the peer consumer by the data server;
 generating information for use in the peer consumer extracting the requested data from the encrypted instance of the requested data; and
 invoking a seventh smart contract of the blockchain network to save the information for use in the peer consumer extracting the requested data and a cryptographic key for the encrypted instance of the requested data to the blockchain network, wherein the information for verification of data received from the data server is provided to the peer consumer by the data server with the encrypted instance of the requested data, wherein the cryptographic key is provided to the peer consumer after the peer consumer generates, using the encrypted instance of the requested data and the information for verification of data received from the data server, corresponding information for use in the peer consumer extracting the requested data and invokes an eighth smart contract of the blockchain network to provide the corresponding information for use in the peer consumer extracting the requested data to the blockchain network.

\* \* \* \* \*